UNITED STATES PATENT OFFICE.

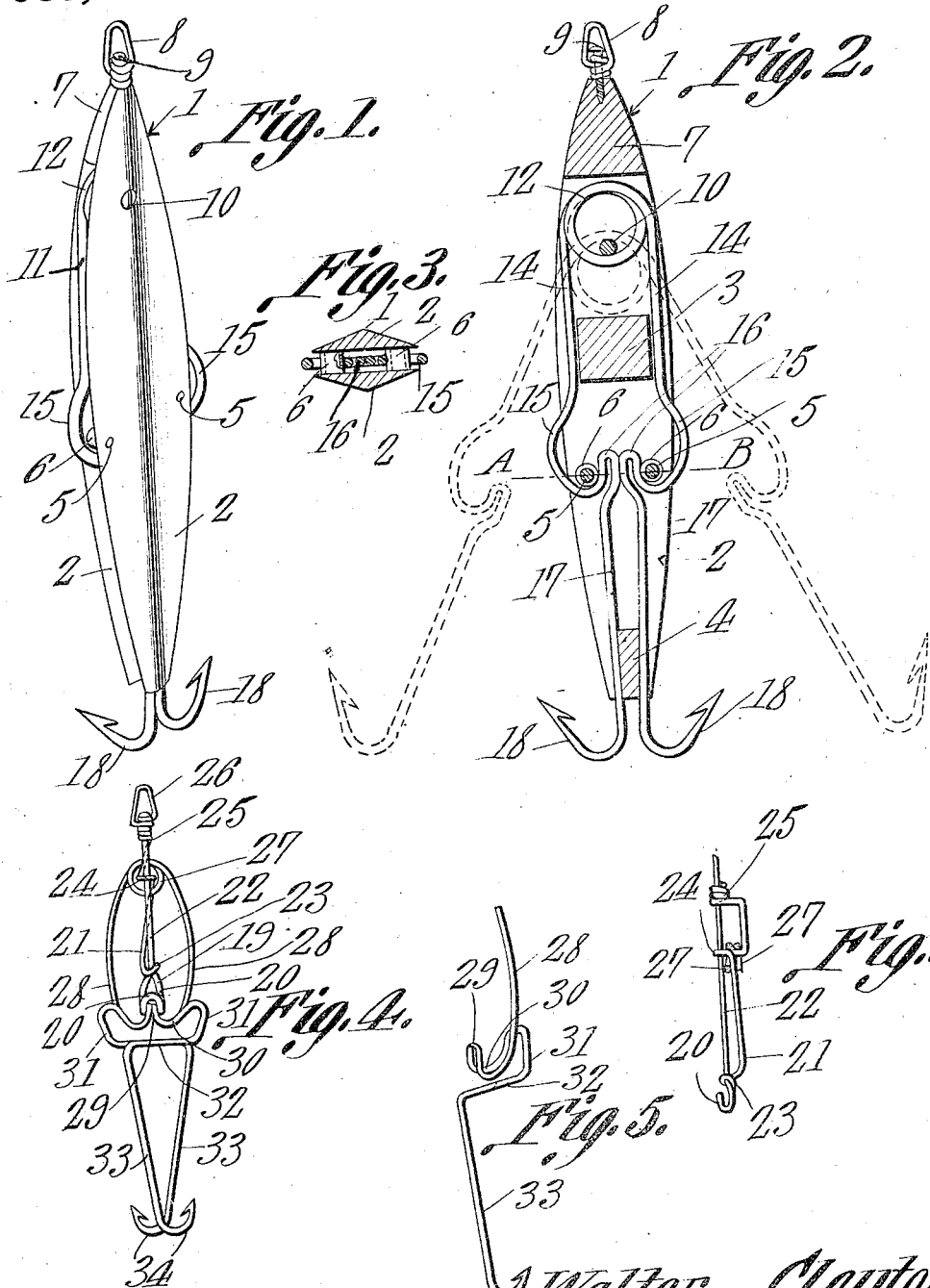

WALTER CLAYTON, OF BELMAR, NEW JERSEY.

SPREAD-HOOK.

985,659.

Specification of Letters Patent. Patented Feb. 28, 1911.

Application filed October 19, 1910. Serial No. 587,934.

*To all whom it may concern:*

Be it known that I, WALTER CLAYTON, a citizen of the United States, residing at Belmar, in the county of Monmouth and State of New Jersey, have invented a new and useful Spread-Hook, of which the following is a specification.

It is the object of this invention to provide a spread hook for fishing purposes, so constructed that a slidable, compressible trapping member may be held under tension, to be disengaged for expansion when seized by the fish or other game.

Another object of the invention is to provide a device of this character in which the resilient trapping arms may readily be set manually.

Another object of the invention is to provide a hook of the sort above mentioned which will be readily sprung by the fish or other game, the hook, however, being unlikely to be sprung accidentally.

With the above and other objects in view, the invention consists in the novel construction and arrangement of parts to be herein after more particularly described, illustrated in the drawings, and set forth in the appended claims.

In the drawings, Figure 1 shows the invention in perspective, the same being in set position; Fig. 2 is a longitudinal section showing the trapping arms in set position, in solid line, the trapping arms being shown in sprung position, in dotted line; Fig. 3 is a transverse section upon the line A—B of Fig. 2; Fig. 4 is a side elevation showing a modification of the invention; Fig. 5 is a perspective showing a detail enlarged from Fig. 4; Fig. 6 is an edge elevation of the body portion of the device shown in Fig. 4, parts being broken away.

In carrying out the invention there is provided, as a primary and fundamental element, a body 1. This body 1 is spindle-shaped in general outline, and includes oppositely positioned side plates, connected in their intermediate portions by a bridge 3, the side plates 2 being connected adjacent their ends, by other bridges 4 and 7. The plates 2, between the bridges 3 and 4 are united by spaced spindles 5 upon which rollers 6 or other antifrictional elements are journaled for rotation. To one end of the body 1 a swivel 8 may be secured by means of a pin 9 or other device adapted to that end. Located between the bridges 7 and 3, and uniting the side plates 2, is an auxiliary pintle 10.

The trapping member is denoted generally by the numeral 11 in Fig. 1. This trapping member 11 is preferably a one-piece structure, bent upon itself to form an eye 12 at one end, which eye 12 is engaged with the auxiliary pintle 10. Beyond the eye 12 the constituent material of the trapping member is fashioned into arms 14. The arms 14 are bent outwardly as at 15 to form shoulders, the extremities of these shoulder forming portions 15 being looped to form fingers 16, located relatively near to the longer axis of the body 1, and extending toward the bridge 3, when, as shown in Fig. 2, the clamping member is in set position. Beyond the looped fingers 16, the constituent material of the trapping member is extended to form continuations 17 of the trapping arms. These portions 17 of the trapping arms protrude beyond the end of the body 1, and terminate in oppositely extended hooks 18 which may or may not be barbed.

Presupposing that the device is in the position indicated in dotted line in Fig. 2, the operation of the same is as follows. The fingers of the operator are engaged against the shoulders 15, compressing the resilient trapping arms until the arms bear against the bridges 3 and 4. These bridges 3 and 4 thus serve to position the fingers 16 so that when the trapping member, as a whole, is slid in the direction of the bridge 7, the fingers 16 will ride over the rollers 6 and engage between the spindles 5, as is clearly seen in Fig. 2. The device is now in set position. It is to be noted that when the device is in the set position shown in Fig. 2, the shoulders 15 and the hooks 18 are the only portions of the trapping member which protrude beyond the contour of the body 1. By this construction, the liability of accidentally springing the trapping member is reduced to a minimum. It is of course obvious that the outstanding shoulders 15 permit the trapping member to be placed in the set position shown in Fig. 2 of the drawings, the major portion of the trapping member being housed within the contour of the body 1. It is of course to be understood that the bridges 3 and 4 are somewhat narrower than the side plates 2, so that the spring trapping arms will readily be housed within the contour of the side plates 2, as hereinbefore specified. When the fish or other game seizes the hooks 18, the trapping member will be slid longitudinally of the body 1, the eye 12 in the trapping member permitting the necessary relative movement between the trapping member and the body. The sliding movement of the trapping member will withdraw the fingers from between the pintles 5, and when the spring arms are thus released, the arms will fly outwardly, from the solid line position of Fig. 2 to the dotted line position of said figure.

In Figs. 4, 5 and 6, a modification of the invention is shown. The body portion of the device delineated in Figs. 4, 5 and 6 is preferably fashioned from a single rod of metal, looped on itself as at 19, this looped portion 19 being bent into a hook 20. One portion 21 of the body is bent about the other portion 22 thereof, as shown at 23. The portion 21 is carried upwardly and passed about the portion 23 as shown at 24. The upper extremity of the portion 21 is wound about the portion 22 as shown at 25. Upon the upper end of the portion 22 an eye 26 is mounted for rotary movement. The trapping member in this form of the invention is preferably a one-piece structure, bent upon itself in its intermediate portion to form an eye 27 which is slidably engaged with the portion 24 of the body. Beyond this eye 27 the trapping member branches into resilient arms 28, looped upon themselves intermediate their ends as shown at 29, the looped portions 29 being bent into hooks 30, the constituent material of the trapping member, below the hooks 30 being carried downwardly as at 31, and inwardly as at 32, the extremities of the arms diverging as at 33 and terminating in hooks 34.

The operation of the device shown in Figs. 4, 5 and 6, does not differ greatly from the operation of the device shown in Figs. 1, 2 and 3. It may be said, however, the arms 28 may be pressed toward each other, until the looped portions 29 are in close proximity, whereupon, referring particularly to Fig. 4, the body portion of the device may be slid downwardly until the elements 29 of the spring arms of the trapping member are engaged in the looped portion 19. The spring arms of the trapping member will thus be held under tension, and when the hooks 34 are engaged by the fish, relative movement will be produced between the body and the trapping member, thereby freeing the portions 29 of the trapping member from the portion 19 of the body and permitting the hooks 34 to fly apart in opposite directions.

Having thus described the invention, what is claimed is:

1. A device of the class described comprising a body including spaced side plates and spaced bridges connecting the plates; a trapping member slidable in the body and including resilient arms; the arms and the body having interlocking elements located between the bridges and constituting a means for holding the arms under tension; the bridges receiving the arms when the arms are compressed and slid, to position the interlocking elements for engagement with each other.

2. A device of the class described comprising a body including spaced side plates, spaced bridges connecting the side plates, and pintles connecting the side plates between the bridges; a trapping member slidable in the body and including resilient arms provided with fingers to engage the pintles to hold the arms under tension; the bridges receiving the arms when the trapping member is compressed and slid, to guide the fingers into engagement with the pintles.

3. A device of the class described comprising a body including spaced side plates, bridges connecting the plates, spaced pintles connecting the plates and located between the bridges, and an auxiliary pintle connecting the plates and located beyond one bridge; and a trapping member formed with an eye at one end engaging the auxiliary pintle for limited sliding movement, the trapping member including resilient arms formed with outstanding shoulders and provided with inwardly projecting fingers engaging the spaced pintles when the trapping member is slid, to hold the arms under tension; the bridges engaging the arms to guide the fingers into engagement with the pintles; the shoulders and the game engaging ends of the arms only protruding beyond the contour of the body when the fingers and the pintles are interengaged.

In testimony that I claim the foregoing as my own, I have hereto affixed my signature in the presence of two witnesses.

WALTER CLAYTON.

Witnesses:
J. H. MORTON,
NEIL H. MILLER.